United States Patent Office 3,409,552
Patented Nov. 5, 1968

3,409,552
ALKYL ARYL ETHER POLYMERS IN
LUBRICANTS
Donovan R. Wilgus, Richmond, Calif., assignor to Chevron Research Company, San Francisco, Calif., a corporation of Delaware
No Drawing. Original application Apr. 1, 1964, Ser. No. 356,671, now abandoned. Divided and this application Dec. 5, 1966, Ser. No. 598,943
2 Claims. (Cl. 252—52)

This application is a division of application Ser. No. 356,671, filed Apr. 1, 1964, now abandoned.

This invention relates to new and useful alkyl aryl ether polymers. More particularly, this invention is concerned with novel dialkylphenylene ether polymers and lubricant compositions containing them having an outstanding viscosity index.

Lubricant compositions in many present-day applications contain viscosity index improvers in order to be more effective over a wide temperature range. At low temperatures, such as normal starting temperatures of internal combustion engines, the lubricant compositions must be sufficiently fluid to circulate freely and provide a lubricating film between wearing surfaces, such as bearings, piston rings, and cylinder walls. On the other hand, at high temperatures like the usual operating temperatures of internal combustion engines, the lubricant composition should be thickened enough to give a similarly protective lubricating film.

It has now been found that surprisingly improved viscosity indexes are provided in a lubricant composition comprising a major proportion of an oil of lubricating viscosity and a minor proportion sufficient to improve the viscosity index of said oil of the polymer of 2,6-dialkyl-1,4-phenylene ether in which one alkyl group is methyl or ethyl and the other is a straight-chain alkyl radical containing from 8 to 12 carbon atoms, said polymer having a molecular weight in the range of 10,000 to 100,000.

The lubricant composition containing the novel dialkylphenyl ether polymer of this invention as described above possesses an unusually high viscosity index compared to other lubricant compositions containing viscosity index improvers as previously suggested in the art. The particular balance of the carbon atoms in the alkyl groups of the polymer, as well as the molecular weight, are critical to the improved viscosity-temperature characteristics as shown by the high viscosity indexes. Other closely related polymers of aryl ethers in lubricant compositions are remarkably less effective by comparison.

The dialkylphenyl ether polymers of the invention are also useful as thickeners in general. In addition to their use as viscosity index improvers in lubricating oil compositions, they may be employed as thickening agents in paints or asphaltic surfacing compositions.

Suitable alkyl radicals containing from 8 to 12 carbon atoms within the above description include the octyl, nonyl, decyl, undecyl and dodecyl radicals. The molecular weight of the polymer in the 10,000 to 100,000 range is based on standard viscosity terminations.

The polymers are ordinarily used in lubricating oils at concentrations from about 1 to about 20% by weight. However, lubricating oil concentrates containing as high as 60 or 70% by weight of the polymers in base lubricating oil may also be provided in accordance with the invention.

The following examples illustrate the preparation of the dialkylphenylene ether polymers.

Example 1.—Orthocresyl pelargonate

A 250-ml. Erlenmeyer flask was charged with 79 g. (0.5 mole) pelargonic acid and 24.7 g. (0.18 mole) phosphorus trichloride. This is a 10 mole percent excess of the phosphorus trichloride. The mixture was heated and swirled intermittently on the steam plate for 45 minutes. The acid chloride was decanted from the phosphorus acid into a separatory funnel. 54 g. (0.5 mole) orthocresol was charged to a 500-ml., 3-neck flask and the acid chloride was added slowly. The temperature of the reaction was allowed to rise at will during the addition, and the mixture was stirred and heated at 300–330° F. for another 3 hours. The mixture was then purged for ½ hour with nitrogen and distilled under a vacuum of 0.6 mm. of mercury. 95 g. of product was obtained boiling from 122–129° C.

Example 2.—2-methyl-6-pelargonylphenol

A 1-liter flask was charged with 86 g. (0.346 mole) of orthocresyl pelargonate and 56 g. (0.42 mole) of pulverized aluminum trichloride. On intimate mixing, the temperature rose to 75° C. The flask was placed in an oil bath which was slowly heated and maintained at 160–170° C. for ½ hour. After cooling, the contents were poured into 300 cc. of 20% aqueous hydrochloric acid. 500 cc. of benzene was added to dissolve the product and the aqueous mixture was separated and discarded. The benzene solution was washed twice with water, dried over anhydrous sodium sulfate, and freed of solvent. The dry product was distilled and yielded 28.9 g. of the ortho isomer and 40.7 g. of the paraisomer. The ortho isomer boiled at 132–143° C. at a pressure of 0.1 mm. of mercury. The ratio of ortho to para isomer was 2:3.

Example 3.—2-methyl-6-nonylphenol 200 g. mossy zinc, 300 cc. water, 5.0 g. mercuric chloride and 5 cc. concentrated hydrochloric acid were stirred for ½ hour at room temperature. The aqueous solution was decanted and the remaining zinc was washed with water. 150 cc. each of water and concentrated hydrochloric acid were then added along with a solution containing 300 cc. of ethanol and 28.5 g. (0.115 mole) of 2-methyl-6-pelargonylphenol. The mixture was heated at reflux (188–190° F.) for a 24-hour period. The liquid phases were separated from the zinc and the aqueous portion separated from the organic phase. The aqueous portion was extracted with benzene and the benzene extract added to the organic phase. This benzene solution was water washed until neutral and the benzene was removed by distillation. The crude product was distilled and 23.8 g. recovered boiling at 124–126° C. at a pressure of 0.1 mm. of mercury. An infrared spectrum indicated disappearance of the carbonyl band of the original ketophenol.

Example 4.—Poly-2-methyl-6-nonyl-1,4-phenylene ether

A 1-liter, 3-neck flask was equipped with a stirer, thermometer, and gas inlet tube. The flask was charged with 250 cc. of benzene, 45 cc. of pyridine, 0.4 g. of cuprous chloride and 11.5 g. of 2-methyl-6-nonylphenol. Oxygen was aded into the gas inlet tube and the mixture was stirred at ambient temperature. The amount of oxygen used was measured and amounted to 98% of theory at the end of 2 hours. The mixture was filtered to remove inorganic salt and the filtrate was concentrated on the steam plate. The polymer was precipitated with methanol, dissolved in 100 cc. of benzene, and reprecipitated. This procedure was repeated. No benzene insoluble polymer was observed, and the supernatant solution of the last precipitation was clear. The polymer was dried in a vacuum oven at 100° C. for 3 hours. 9.7 g. was recovered.

The polymer of 2-methyl-6-nonyl-1,4-phenylene ether was blended with a typical solvent-refined mineral lubricating oil, namely, 150 Neutral Oil and with an aromatic synthetic oil, namely, 1-n-nonyl-4-"iso"-octylbenzene. It has a marked thickening action in the oils, and the viscosity indexes of the blended oils were markedly improved. The polymer also has excellent thermal stability as determined by subjecting the thickened oils to a temperature of 700° F. for 6 hours. The properties of the blended oils are listed in the following table.

TABLE

| Base oil | Percent | Pour Point, °F. | Visc. at 100° F., cs. | Visc. at 210° F., cs. | V.I. |
|---|---|---|---|---|---|
| 1-n-nonyl-4-"iso"-octylbenzene | Nil | <−107 | 9.25 | 2.65 | 138 |
| Do | 4.0 | <−90 | 27.6 | 7.03 | 176 |
| Do | 10.0 | −80 | 89.23 | 19.64 | 153 |
| Do | 10.0 | −92 | 28.30 | 6.69 | 170 |
| Do | 13.0 | | 39.7 | 8.77 | 161 |
| Do | 10.0 | | 16.9 | 4.15 | 172 |
| Do | 5.0 | | 17.5 | 4.50 | 187 |
| Do | 10.0 | | 30.2 | 7.36 | 169 |
| 150 Neutral Oil | Nil | | 30.7 | 4.92 | 89 |
| Do | 2.8 | | 65.0 | 10.12 | 134 |
| Do | 3.5 | | 70.37 | 10.83 | 144 |
| Do | 5.0 | | 102.0 | 15.23 | 137 |

The polymeric additives of this invention can be used with good effect in the case of any one of a wide variety of oils of lubricating viscosity, or of blends of such oils. Thus, the base oil can be a refined Pennsylvania or other paraffin base oil, a refined naphthenic base oil, or a synthetic hydrocarbon or nonhydrocarbon oil of lubricating viscosity. As synthetic oils there can be alkylated waxes and similar alkylated hydrocarbons of relatively high molecular weight, hydrogenated polymers of hydrocarbons, and the condensation products of chlorinated alkyl hydrocarbons with aryl compounds. Other suitable oils are those which are obtained by polymerization of lower molecular weight alkylene oxides, such as propylene and/or ethylene oxide. Still other synthetic oils are obtained by etherification and/or esterification of the hydroxy groups in alkylene oxide polymers, such as, for example, the acetate of the 2-ethylhexanol-initiated polymer of propylene oxide. Other important classes of synthetic oils include the various esters, as, for example, di-(2-ethylhexyl) sebacate, tricresyl phosphate, and silicate esters, such as hexa-(2-ethylbutoxy) disiloxane. If desired, the oil can be a mixture of mineral and synthetic oils.

While satisfactory lubricant compositions can be obtained by adding to the base oil employed only one or more of the polymeric additives of the type described above, it also falls within the purview of this invention to provide lubricant compositions which contain not only such polymers, but also other additives, such as oiliness and extreme pressure agents, antioxidants, corrosion inhibiting agents, blooming agents, pour point depressants, etc., which improve the characteristics of the oil. The present invention also contemplates the addition to the lubricant composition (particularly when the amount of polymer employed is relatively small) of detergents and/or antiwear agents.

Illustrative lubricant compositions of the above type containing the polymeric additives of the invention in combination with other agents may include, for example, from about 0.1 to 10% by weight of alkaline earth metal higher alkylphenate and sulfonate detergents, such as calcium alkylphenates having an average of approximately 14 carbon atoms in the alkyl group and basic calcium petroleum sulfonate, as well as organic thiophosphate corrosion and high temperature oxidation inhibitors, such as the reaction product of pinene and $P_2S_5$ and the bivalent metal dihydrocarbyl dithiophosphates, zinc butylhexyl dithiophosphate and zinc tetradecylphenyl dithiophosphate in amounts of from about 0.1 to 10% by weight of the composition.

While the character of this invention has been described in detail with numerous examples, this has been done by way of illustration only and without limitation of the invention. It will be apparent to those skilled in the art that numerous modifications and variations of the illustrative examples may be made in the practice of the invention within the scope of the following claims.

I claim:
1. A lubricant composition comprising a major proportion of an oil of lubricating viscosity and minor proportions sufficient to improve the viscosity index of said oil of the polymer of 2,6-dialkyl-1,4-phenylene ether in which one alkyl group is selected from the class consisting of methyl and ethyl radicals and the other alkyl group is a straight-chain alkyl radical containing from 8 to 12 carbon atoms, said polymer having a molecular weight in the range of 10,000 to 100,000.

2. A lubricant composition comprising a major proportion of an oil of lubricating viscosity and a minor proportion sufficient to improve the viscosity index of said oil wherein the polymer according to claim 1 is one in which one alkyl group is methyl and the other alkyl group is nonyl.

References Cited

UNITED STATES PATENTS

| 3,087,892 | 4/1963 | Wilgus | 252—52 |
| 3,203,997 | 8/1965 | Mahoney et al. | 252—52 X |
| 3,231,499 | 1/1966 | Smith | 252—52 X |

FOREIGN PATENTS 851,651  10/1960  Great Britain.

DANIEL E. WYMAN, *Primary Examiner.*

W. H. CANNON, *Assistant Examiner.*